G. A. HENDRICKSON.
PISTON RING.
APPLICATION FILED FEB. 20, 1919.
1,369,104.
Patented Feb. 22, 1921.
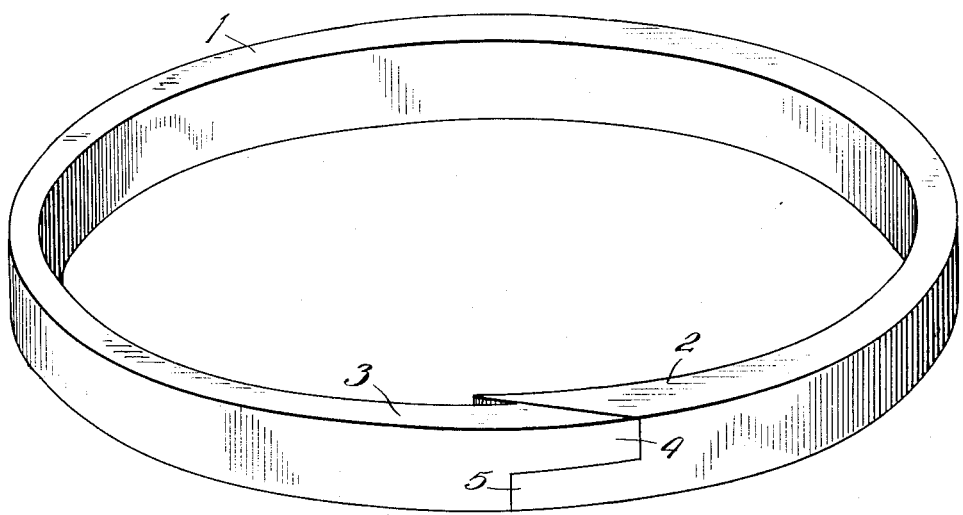
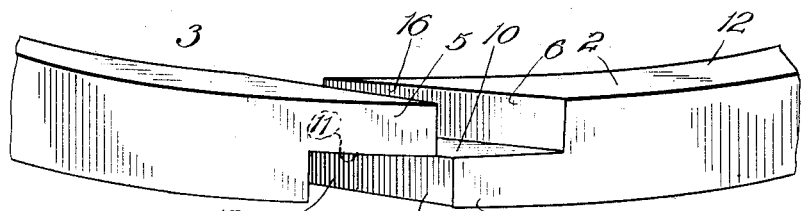
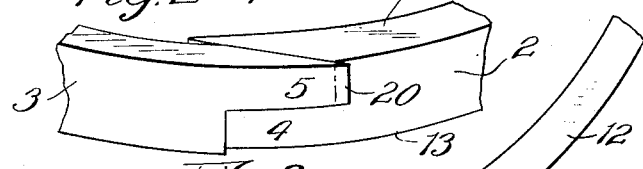
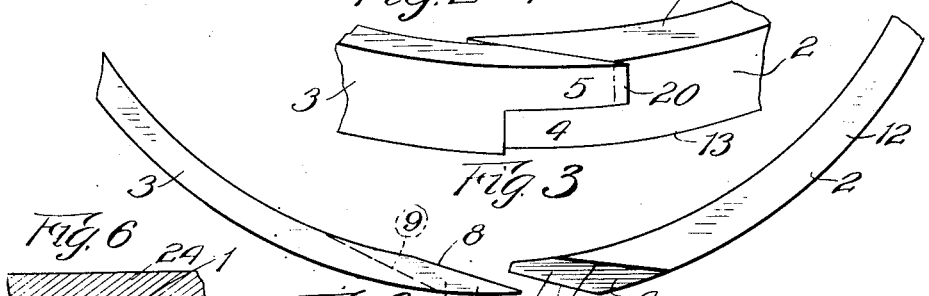
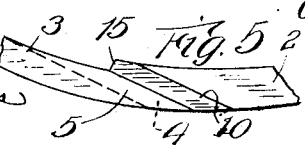
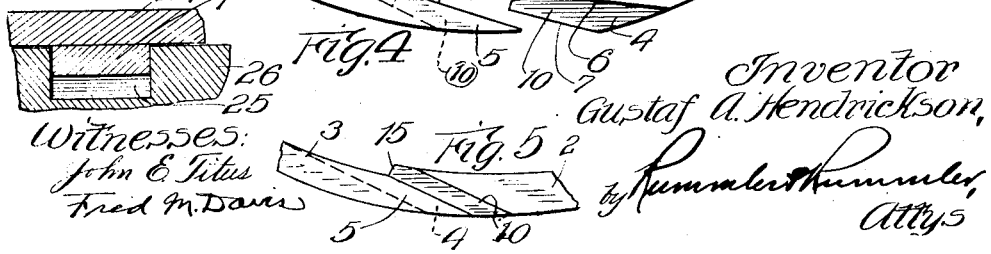
Inventor
Gustaf A. Hendrickson,
Witnesses:
John E. Titus
Fred M. Davis

UNITED STATES PATENT OFFICE.

GUSTAF A. HENDRICKSON, OF CHICAGO, ILLINOIS.

PISTON-RING.

1,369,104.  Specification of Letters Patent.  Patented Feb. 22, 1921.

Application filed February 20, 1919. Serial No. 278,140.

*To all whom it may concern:*

Be it known that I, GUSTAF A. HENDRICKSON, a citizen of the United States of America, and a resident of Chicago, county of Cook, and State of Illinois, have invented certain new and useful Improvements in Piston-Rings, of which the following is a specification.

The main objects of this invention are to provide an improved form of piston ring and method of making same; to provide a piston ring having a joint formed with overlapping parts adapted to more effectively prevent leakage, especially to choke and minimize leakage after a given amount of wear; to provide such a ring in which the overlapping parts of the joint are so formed as to permit of springing one side inward for insertion or removal of the ring without any material expansion or contraction peripherally; to provide a split ring of such shape and character as to insure sufficient expansion to fit tightly in the cylinder without wearing the latter injuriously; and to provide in a piston ring an overlapping joint adapted to stand more wear without appreciable leakage, and so formed that when worn the leakage path will be of less size in cross section and of greater length than for a corresponding amount of wear in ordinary rings.

An illustrative embodiment of this invention is shown in the accompanying drawings, in which—

Figure 1 is a perspective view of the ring in the closed position intended for it normally to assume when in use.

Fig. 2 is a perspective view slightly enlarged, of the joint opened somewhat, substantially as it would appear when the ring is removed from the piston.

Fig. 3 is similar to Fig. 2, except that the joint is closed with a slight excess of overlap, as may occur for a short time when a new ring is applied, having some allowance for initial wear.

Fig. 4 is a plan of the joint with the ends spaced apart, about as in Fig. 2.

Fig. 5 is a plan of the joint showing the parallel milling cuts, with the ring ends not fully severed from each other.

Fig. 6 is a cross section taken remote from the ring joint radially of the cylinder and lengthwise of the latter through a small part of the ring.

In the embodiment shown in the drawings, the ring 1 is of oblong rectangular cross-section and uniform width, but of tapering thickness from the large end 2 to the thinner opposite end 3. The ends are formed with similarly overlapping parts 4 and 5 respectively disposed in parallel planes perpendicular to the axis of the ring. The transversely disposed faces of the joint are planes which are more or less approximately tangential to the inner face of the ring. Thus we have substantially a double scarf rabbet joint.

The large end 2 has two such faces 6 and 7 and the small end 3 has two corresponding faces 8 and 9 respectively. These four faces are all of the same width measured in the axial direction, and the coacting radial faces 10 and 11 of the large and small ends respectively are disposed centrally between the edges or radial sides 12 and 13 of the ring. Said faces 10 and 11 are of like width so as to permit of close contact between both pairs of faces 6—8 and 7—9 when the joint is closed. This stepped construction of the ends prevents any direct leakage through the ring, and whatever leakage may occur must pass inward and around the laps 4 and 5.

Rings embodying this invention may be made in various ways, as for instance, forging, or molding and machining, but the preferred method of making them is as follows: A tubular casting is made in which a longitudinal interior shoulder 15 is formed on one side (see Fig. 5), said shoulder being somewhat rib-like and being formed with a nearly radial face on one side and the other side tapering off around the tube to the first-mentioned side, the taper preferably being uniform and extending substantially all the way around the cylinder. This cylinder is then trued up exteriorly by turning in a lathe and then is cut into short sections, each constituting a blank from which a piston ring may be made by the next step, which consists in cutting slots 16 and 17, one on each side in substantially parallel relation and nearly tangential to the inner face, and so positioned staggerwise as to be somewhat but not entirely out of registry, but so formed and arranged as to communicate at their adjacent corners, whereby the slots supplement each other to cut across completely through the body of the ring, as shown in Fig. 2.

The slots 16 and 17 must have sufficient width to provide a generous mutual overlap and may to best advantage be formed by means of milling cutters, as will be understood. The slots may be formed one at a time, but preferably a machine is rigged with a pair of cutters arranged to cut the slots simultaneously. These slots may overlap each other more or less, but for a given width of slot the less they overlap the more the ring will be shortened when the joint is closed, and care must be observed that the ring be not shortened too much. Such a slight overlap occurs normally, but when the ring is forcibly contracted so as to fit the bore of the cylinder, not only is the gap between the forward edges of laps 4 and 5 closed, but the said laps slide one against the other on their inner face 10 and 11, as shown by Fig. 1. There may to advantage be a slight excess of end overlap at first, as at 20 on Fig. 3, so as to allow for some initial wear whereby the fit may be worn perfect and will be more enduring.

As the outer face of the ring gradually wears away the inherent expansibility of the ring tends to open up the joint slightly, which results in the appearance of a long, thin narrow slit or crack on each side of the ring between the faces 6—8 and 7—9 respectively. Leakage tends to occur lengthwise of these cracks in series. Owing to the tangential slant of these cracks, however, the width of each is much less and the length is much greater than if the joint were radial. Hence the clogging effect of the oil, steam, gas, et cetera, in the joint is also much greater. The leakage path is tortuous, extending inward through one crack, across the inner side and out through the other crack. As a sum total result, the gas pressure leakage is reduced to a minimum which is practically negligible until the ring has been in use for a very long time, much longer than ordinary rings would last.

The inclination of the joint slots 16 and 17 permits of springing one side inward for insertion of the ring into the cylinder without materially altering the peripheral length of the ring. The slots are of course so inclined respecting the large and small ends that the large end is depressible, the inner edge projecting past the outer part.

In order that the rings when finished may have a sufficiently expansive set to bind tightly against the interior walls of the cylinder, they may be hammered slightly in a manner adapted for straightening. The tapering thickness of the ring from end to end permits of giving it a strong expansive set without causing appreciable local wear on the cylinder such as sometimes occurs adjacent to the ends of plain rings of ordinary form.

Referring to Fig. 6, it will be seen that the ring 1 bears tightly against the inner side of the cylinder 24, and has a substantially tight fit at its edges with the radial walls of the annular slot 25 in the piston 26. There is ample clearance between said ring and the bottom of said slot to permit sufficient overlap of the ring ends to facilitate assembling the device.

Although but one specific embodiment of this invention is herein shown and described, it will be understood that numerous details of the construction shown may be altered or omitted without departing from the spirit of this invention as defined by the following claims.

I claim:

1. A piston ring of the character described, tapering in radial thickness from one end to the other, the ends being correspondingly beveled.

2. A piston ring of the character described, tapering in radial thickness from one end to the other, the ends being correspondingly beveled, the larger end on the outer side and the smaller end on the inner side.

3. A piston ring of the character described, tapering in radial thickness from one end to the other, the ends being correspondingly beveled, the larger end on the outer side and the smaller end on the inner side, the said ends being stepped and formed with radially disposed overlaps.

Signed at Chicago this 18th day of Feb. 1919.

GUSTAF A. HENDRICKSON.